(12) United States Patent
Tanaka

(10) Patent No.: US 6,358,148 B1
(45) Date of Patent: Mar. 19, 2002

(54) CONTROL METHOD, APPARATUS AND CARRIER WAVE FOR DIFFICULTY IN A VIDEO GAME

(75) Inventor: Hiromichi Tanaka, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/538,121

(22) Filed: Mar. 29, 2000

(30) Foreign Application Priority Data

Sep. 20, 1999 (JP) .......................................... 11-265483

(51) Int. Cl.⁷ ................................................ A63F 13/00
(52) U.S. Cl. ........................................ 463/23; 463/43
(58) Field of Search ............................... 463/23, 1, 40, 463/41, 42, 43, 44

(56) References Cited

U.S. PATENT DOCUMENTS

| | | | | |
|---|---|---|---|---|
| 4,657,247 A | * | 4/1987 | Okada | 463/23 |
| 4,679,789 A | * | 7/1987 | Okada | 463/23 |
| 4,858,930 A | * | 8/1989 | Sato | 463/23 |
| 5,267,734 A | * | 12/1993 | Stamper et al. | 463/23 |
| RE34,728 E | * | 9/1994 | Hall-Tipping | 463/23 |
| 5,377,100 A | * | 12/1994 | Pope et al. | 463/23 |
| 5,558,339 A | * | 9/1996 | Perlman | 463/42 |
| 5,683,082 A | * | 11/1997 | Takemoto et al. | 463/23 |
| 5,720,663 A | * | 2/1998 | Nakatani et al. | 463/23 |
| 5,775,995 A | * | 7/1998 | Okamoto | 463/40 |
| 5,885,156 A | * | 3/1999 | Toyohara et al. | 463/1 |
| RE36,675 E | * | 4/2000 | Yamamoto et al. | 463/23 |
| 6,045,447 A | * | 4/2000 | Yoshizawa et al. | 463/43 |

FOREIGN PATENT DOCUMENTS

| | | |
|---|---|---|
| JP | 06277364 A | 10/1994 |
| JP | 07275509 A | 10/1995 |
| JP | 09225141 A | 9/1997 |

OTHER PUBLICATIONS

Nintendo Brochure, Game Boy Pocket Monsters, 1997. (English tranlation included).

* cited by examiner

*Primary Examiner*—Michael O'Neill
(74) *Attorney, Agent, or Firm*—Beyer Weaver & Thomas, LLP

(57) ABSTRACT

Methods and apparatus for controlling the difficulty in a video game are disclosed. According to one aspect of the present invention, a role playing video game is allowed to progress by clearing a plurality of stages for which individual difficulties are set. A control method for such a video game includes selecting one stage from said plurality of stages in response to a command provided by a game player. The difficulty of the selected stage is adjusted substantially each time an event that is voluntarily challengeable on the selected stage is cleared by the game player during execution of the game, and the difficulties of at least one of the plurality of stages is adjusted in accordance with the difficulty of the selected stage at a clearing time when the selected stage is cleared by the game player's operation during execution of the game.

8 Claims, 15 Drawing Sheets

Fig.4

PLAYER CHARACTER

ABILITY INFORMATION STORAGE DIVISION 124a

| ABILITY | MAXIMUM HIT POINT (HPmax) | ATTACK POWER (Atk) | HITTING RATE (Hit) | DEFENSE POWER (Def) | EVASION ABILITY (Eva) | MAGIC ATTACK POWER (MAtk) | MAGIC DEFENSE POWER (MDef) |
|---|---|---|---|---|---|---|---|
| INITIAL ABILITY VALUE | 50 | 8 | 70 | 5 | 8 | 7 | 7 |
| FINAL ABILITY VALUE | 750 (End_HPmax) | 80 | 90 | 75 | 20 | 50 | 20 |
| CURRENT ABILITY VALUE | 50 (HPmax) | 8 | 70 | 5 | 8 | 7 | 7 |
| ABILITY VALUE IMMEDIATELY AFTER LEVEL RISE | 750 (Base_HPmax) | 8 | 70 | 5 | 8 | 7 | 7 |

Fig.5

ENEMY CHARACTER

ABILITY INFORMATION STORAGE DIVISION (125a)

| ABILITY | MAXIMUM HIT POINT (HPmax) | ATTACK POWER (Atk) | HITTING RATE (Hit) | DEFENSE POWER (Def) | EVASION ABILITY (Eva) | MAGIC ATTACK POWER (MAtk) | MAGIC DEFENSE POWER (MDef) |
|---|---|---|---|---|---|---|---|
| CURRENT ABILITY VALUE | 40 | 4 | 30 | 3 | 4 | 3 | 3 |

Fig.6

127 LEVEL-ORGANIZED BATTLE-RELATED INFORMATION STORAGE DIVISION

| LEVEL | NUMBER OF DEFEATED BOSS CHARACTERS | ASSUMED NUMBER OF BATTLES | SPECIFIC GRAVITY OF ORDINARY CHARACTERS |
|---|---|---|---|
| 1 | 0 | 5 | 5 |
| 2 | 1 | 6 | 7 |
| 3 | 2 | 10 | 7 |
| ⋮ | ⋮ | ⋮ | ⋮ |
| 99 | 98 | 15 | 7/10 |

Fig.7

128 WEIGHT TABLE STORAGE DIVISION

| DUNGEON NUMBER | ASSUMED CLEAR LEVEL | WEIGHT OF ENEMY |
|---|---|---|
| 1 | 1 | 1 |
| 2 | 2 | 2 |
| 3 | 3 | 4 |
| ⋮ | ⋮ | ⋮ |
| 99 | 99 | 23213 |

End_HPmax = HPmax AT MAX LEVEL

Base_HPmax = HPmax IMMEDIATELY AFTER START OF GAME

NUMBER OF CLEARED DUNGEONS

B1 (Next_HPmax ACCEPTABLE RANGE)

PARAMETER SETTING PROCESS AFTER CLEARANCE OF FIRST DUNGEON

End_HPmax = HPmax AT MAX LEVEL

NUMBER OF CLEARED DUNGEONS

CONTROL METHOD, APPARATUS AND CARRIER WAVE FOR DIFFICULTY IN A VIDEO GAME

BACKGROUND OF THE INVENTION

1. Field of the Invention

The present invention relates generally to video games. More particularly, the present invention relates to a method for controlling the difficulty in a video game which is made to progress by clearing a plurality of stages for which individual difficulties are set, a storage medium for storing a program which embodies the method for controlling difficulty in the video game, and a game apparatus.

2. Related Background Art

Role playing games (hereinafter referred to as RPGs) are one type, or class, of video games. The RPGs are typically games in which a story is developed through conversation between a player character and another character or through battles between a player character and an enemy character through manipulating the player character on a screen. In such RPGs, ability values given to the player character may be increased through repetition of battles between the player character and an enemy character. The increasing ability values may be the maximum (HPmax) of a hit point (HP), an attack power, and so on, as will be appreciated by those skilled in the art. Through increasing the ability values given to the player character, the player character, manipulated by a player, or user, often acquires the ability to beat a strong enemy character, which makes it possible to move the story forward, e.g., allow the game to progress.

In conventional RPGs, when the player character beats an enemy character in a battle during the game, an experience value is often awarded to the player character used in the battle. The degree or magnitude of the experience value is typically determined by the mightiness of the beaten enemy. When the experience value accumulated by the player character exceeds a predetermined value, a level set for the player character is raised. The rise of the level generally increases the various ability values associated with the player character. The increase in the ability values lowers the difficulty for the player character win battles thereafter. In cases where the player character competes with an extremely strong enemy. e.g., an enemy such as a boss character that appears last in a dungeon set as a stage of a RPG, the player character may defeat the boss character easily by raising the level of the player character through experience of as many matches or battles with weaker enemy characters as possible. However, more time is typically necessary for playing the matches with weaker enemy characters. Thus, a player who wants to clear all the stages of a RPG as early as possible would typically have to fight with the boss character after few matches with weaker enemy characters. When a player fights with the boss character without first fighting many matches with weaker enemy characters, the player character is often forced to have a difficult game by virtue of the degree of the low level of the player character. In this case, the player character may defeat the boss character by selectively using various items in order to advance the battle advantageously, or by making an attack at a weak point of the boss character.

SUMMARY OF THE INVENTION

In conventional methods of imparting an experience value according to the mightiness of an enemy character result in the experience value, which is lent to the player character after the defeat of the last boss character in the typically later, or dungeon, stages of a RPG, is being determined depending upon only the mightiness or strength of the boss character. In this case, returns such as increases in the experience value that are based upon the mightiness of a boss character are typically insufficient when compared against the implications of a defeat of the extremely strong boss character by a comparatively weak player character to clear the dungeon.

In order to maintain the interest level of a player who wishes to clear or complete the game more quickly, a high-grade strategy may be used. With a high-grade strategy, when the player character wins a difficult battle, the ability of the player character may be raised according to the difficulty thereof. If sufficient growth is acquired by clearing one dungeon, for instance, it may become possible to quickly overcome dungeons with much stronger enemies through the use of similar methods.

The present invention has been accomplished noting the conventional problem described above. One aspect of the present invention provides a difficulty control method in a video game which allows the difficulty to be controlled so that an entire game may be overcome or completed quickly by making free use of a high-grade strategy. In other words, the ability of the player character may be raised according to the difficulty of a cleared stage or stages, paradoxically speaking. The difficulty of sequent stages may be modified according to the difficulty of the cleared stage or stages. In other aspects of the present invention, a storage medium is used for storing a difficulty control program, and a game apparatus is used to enable the difficulty control program to be implemented as a part of a RPG or other video game.

According to one aspect of the present invention, a control method is provided for controlling the difficulty in a video game. The game is allowed to progress by clearing a plurality of stages for which individual difficulties are set. The control method includes selecting one stage from the plurality of stages in response to a command provided by a game player, and gradually adjusting the difficulty of the selected stage every time an event that is voluntarily challengeable on the selected stage is cleared by the game player during the execution of the game. The control method further includes adjusting the difficulties of at least one of the plurality of stages in accordance with the difficulty of the selected stage at a clearing time when the selected stage is cleared by the game player's operation during execution of the game.

Therefore, the difficulty of a selected stage may merely be relaxed gradually every time an event that is voluntarily challengeable on the selected stage is cleared. Alternatively, the difficulties of the other stages may be relaxed when the selected stage is cleared. Thus, sufficient returns are gained, because the difficulties of other stages may be relaxed by clearing a selected stage through making free use of a high-grade strategy. The sufficient returns may maintain the interest of a player in that the player may desire clearing the selected stage more quickly with free use of the high-grade strategy. In addition, since the difficulties of the other stages may be relaxed by clearing one stage, the stages may be completed relatively quickly thereby enabling the player's "play zest" or interest to be further maintained.

In accordance with the above-described embodiment of the present invention, a parameter for adjusting the difficulty of the selected stage may be set, and the degree of the adjustment in the selected stage may depend on the value of the parameter. The upper limit of the parameter may be set for the selected stage, and the value of the parameter may be increased not more than the upper limit, when the degree of the difficulty of the selected stage is relaxed.

Consequently, the adjustment value of the difficulty of the selected stage may be determined when a challengeable event is cleared. However the value is determined, in one embodiment, within a range in which the accumulated value of the difficulty adjustment is not more than the preset upper limit. This implies that only small returns may typically be attained by clearing the voluntarily challengeable event.

Further, in the above invention, when the degree of the difficulty of at least one of a plurality of stages is relaxed, a value corresponding to the difference between the upper limit value of the parameter and that of the parameter may be added to the parameter used for adjusting the difficulty of the selected stage. As a consequence, if the selected stage is cleared in a state of a small accumulated value of difficulty adjustment in the first adjustment step, the difference between the preset value may be greater than or substantially equal to the upper limit, and the accumulated value of difficulty adjustment in the former adjustment will be generally be relatively large. When the selected stage is cleared in the state of the small accumulated value of difficulty adjustment in the previous adjustment step, a large value may be set as an adjusting value of the difficulties of the plurality of stages, which may maintain the player's play zest of desiring to clear the stages relatively quickly by making free use of high-grade strategy.

Still further in the above invention, a game may have such a clearing condition that a player character may need to partake in a virtual battle with an enemy character according to manipulation input. In addition, the player character may win a battle with a predetermined enemy character set in each of a plurality of stages. If such is the case, a method in accordance with the present invention may include relatively adjusting the difficulty of a selected stage by increasing an ability value, which acts more and more advantageously for the player character in the battle as the value becomes larger as well as adjusting the difficulties of at least one of the plurality of stages by increasing the ability value.

Consequently, in the game implementing the virtual battle between the player character and the enemy character in accordance with manipulation input, when the player character wins a battle with an enemy character, the ability value of the player character in the selected stage is increased. In addition, the difficulties of the plurality of stages may be relaxed by increasing the ability value. Therefore, the difficulties of the other stages are effectively adjusted by clearing one stage, which may serve to maintain the player's interest in the RPG.

Further, the present invention may be embodied by enabling or otherwise causing a computer to read in a program stored in a computer-readable storage medium. Therefore, storage media allow the program to be distributed and sold readily in the form of software products independent of an apparatus used to play a game stored on the storage media, e.g., independent of a game apparatus. When the software embodied on the storage media is used in such hardware as general purpose computers, general purpose game apparatus, etc., the game technology of the present invention may be carried out readily by these and other types of hardware.

Still further the present invention may implement a game apparatus which achieves the effect similar to that by the above invention. That is, one aspect of the present invention is a game apparatus which implements the control method described above.

BRIEF DESCRIPTION OF THE DRAWINGS

FIG. 4 is a conceptual diagram to show the details of the ability information storage division of the player character in accordance with an embodiment of the present invention.

FIG. 5 is a conceptual diagram to show the details of the ability information storage division of the enemy character in accordance with an embodiment of the present invention.

FIG. 6 is a conceptual diagram to show the details of the level-organized battle-related information storage division in accordance with an embodiment of the present invention.

FIG. 7 is a conceptual diagram to show the details of the weight table storage division in accordance with an embodiment of the present invention.

DESCRIPTION OF THE PREFERRED EMBODIMENTS

Embodiments of the present invention will be described below in accordance with the drawings. In the following description an application of the present invention to a game machine for home use will be described as an example of one embodiment. It should be understand that the present invention may be applied in a variety of different configurations without departing from the spirit or the scope of the present invention.

Figure 1:
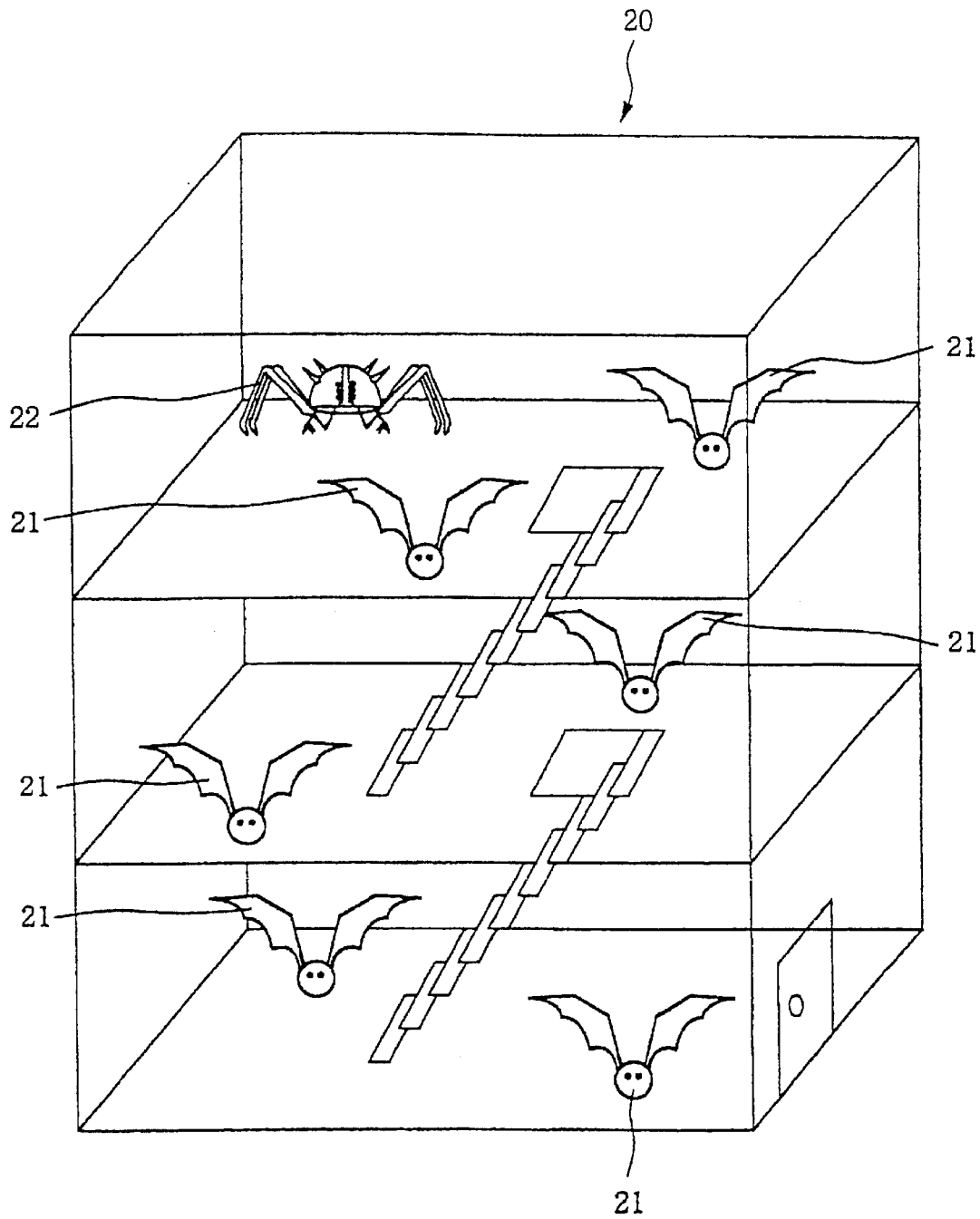
FIG. 1 is a perspective view to show the layout of the dungeon in the game executed by the game apparatus to which an embodiment of the present invention is applied.

In the RPG exemplified in the following embodiment, ninety nine dungeons (stages) 20 as illustrated in FIG. 1 are prepared. It should be under stood that the use of dungeons, and, further, the use of ninety nine dungeons in particular, is only one embodiment of the present invention. In general, dungeons may be replaced by other levels, and the number of dungeons or levels may be widely varied. Hence, although dungeons are discussed below, dungeons are merely examples of levels of a game. In each dungeon 20 there typically exists a plurality of ordinary characters 21 and a single boss character 22. Boss characters 22 considered to be enemy characters, and, thus, ninety nine boss characters are prepared in the game. The player manipulates one of a plurality of player characters, not illustrated, so as to do battles with either or both these ordinary characters 21 and the boss character 22 allowing to make the game progress. The player may be allowed to select one of the dungeons at a start of the game and may be also allowed to select a next dungeon after the player defeats the boss character 22 of the dungeon 20 selected.

Figure 2:
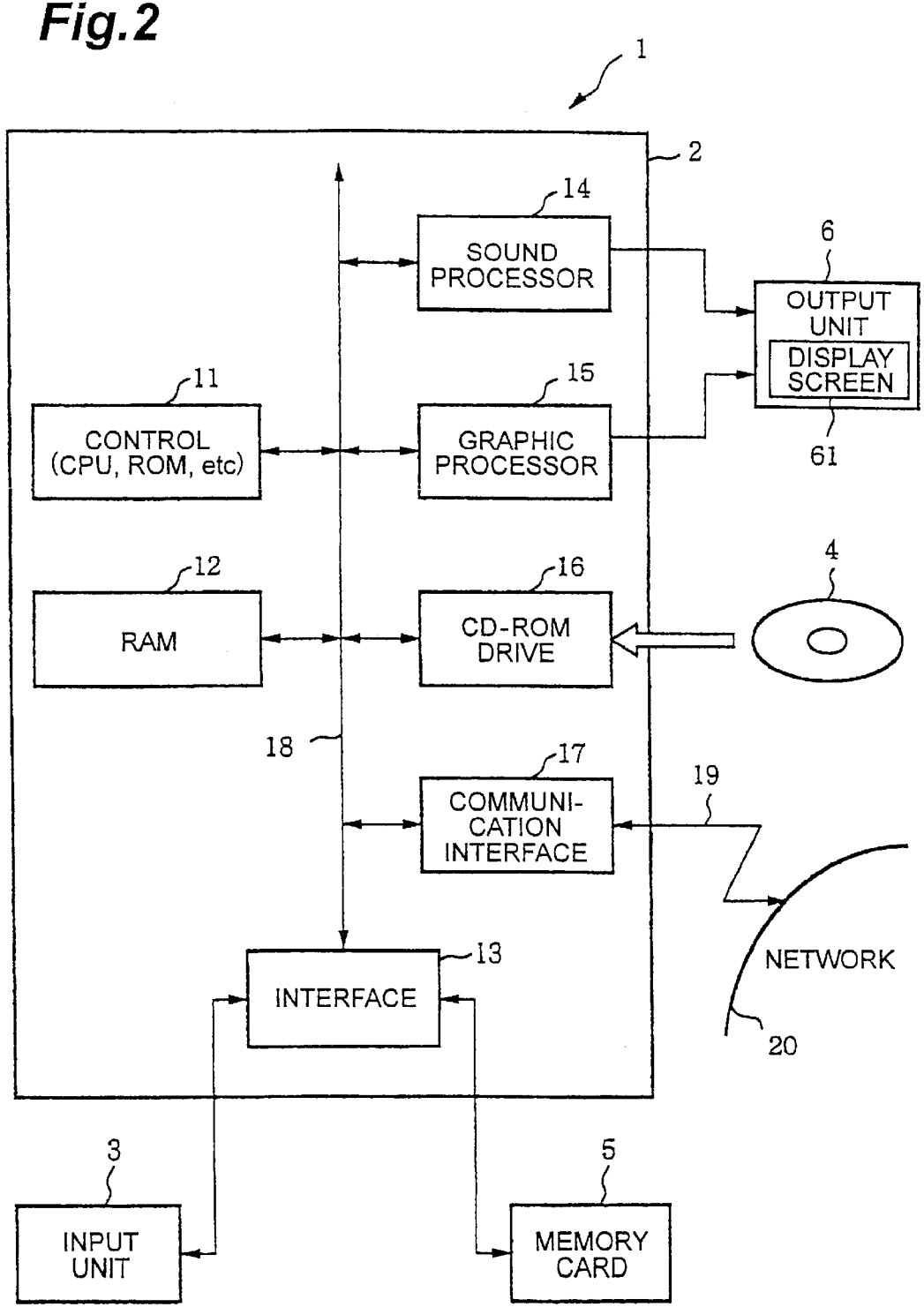
FIG. 2 is a block diagram to show the overall structure of the game apparatus to which an embodiment of the present invention is applied.

FIG. 2 is a block diagram to show the structure of the game apparatus according to the present embodiment. As illustrated, this game apparatus 1 includes, for example, a main body of a game machine 2, an input device 3, a memory card 5, a CD-ROM 4, and an output device 6.

The main body 2 is typically composed of, for example, a control section 11, a RAM (Random Access Memory) 12, an interface section 13, a sound processing section 14, a graphic processing section 15, a CD-ROM (Compact Disc Read Only Memory) drive 16, a detachable CD-ROM 4, and a communication interface 17, which are connected to each other via a bus 18. It should be appreciated that at least some of the components of main body 2 may be removed. Further, main body 2 may also include various other components. By way of example, CD-ROM device 16 and CD-ROM drive 16 and CD-ROM 4 may be replaced by a disk drive and a disk such as a floppy disk.

The control section 11 in described embodiment includes, but is not limited to, a CPU (Central Processing Unit), a ROM (Read Only Memory) storing basic programs including a boot program, an OS (Operating System), and so on, etc. The control section 11 sequentially executes programs stored in the RAM 12 to perform processing that enables the game to progress or otherwise advance. The control section 11 also controls actions associated with each section 12 to 17 in the main body 2.

The RAM 12 is generally used as a main memory of the main body 2, and stores programs and data necessary to enable progress of the game, which may be transferred from the CD-ROM 4. The RAM 12 is also used as a work area during execution of the programs. Areas allocated in the RAM 12 and data stored in the respective areas will be detailed hereinafter.

Connected to the interface section 13 are the input device 3 and the memory card 5 which are detachable in the described embodiment. This interface section 13 generally controls the exchange of data between the input device 3/the memory card 5 and the control section 11/the RAM 12. While the input device 3 may be of substantially any suitable configuration, the input device 3 is often equipped with direction keys and various buttons. Through Manipulation these keys and buttons, the player gives may provide the input necessary for progress of the game. Such input includes, but is not limited to, instructions for movement and instructions for action to the player character. The memory card 5 is a memory for saving data indicating the status of progress of the game. Since the memory card 5 may be readable, th euse of the memory card 5 enables the data indicating the status of progress of the game to be moved, as for example between different game machines.

The sound processing section 14 carries out a process for reproducing sound data that may include sound data such as BGM (Back Ground Music), sound effects, and the like according to the progress status of the game in response to a command from the control section 11 and outputs a voice signal to the output device 6.

The graphic processing section 15 typically performs three-dimensional graphical processing in response to a command from the control section 11 to generate image data according to the progress status of the game. The graphical processing section 15 may be arranged to add a predetermined synchronous signal to the image data generated and outputs the resultant video signal to the output device 6.

The CD-ROM drive 16 generally drives the CD-ROM 4 set in the main body 2 in response to a command from the control section 11 and transfers the programs and data stored in the CD-ROM 4 via the bus 18 to the RAM 12.

In the described embodiment, the communication interface 17 is connected via a communication line 19 to an external network 20 and performs processing for exchange of a program or data with the external network 20 in response to a command from the control section 11. As will be understood by those skilled in the art, the program or data may be exchanged in the form of data signals embodied in carrier waves.

The CD-ROM 4 typically stores the programs and data necessary for the progress of the game. The CD-ROM 4 is driven by the CD-ROM drive 16 such that the programs and data stored therein are read out thereof. The programs and data read out of the CD-ROM 4 are generally transferred from the CD-ROM drive 16 via the bus 18 to the RAM 12 in the form of data signal embodied in carrier waves.

The output device 6 is provided with a display screen 61 which often includes a CRT (Cathode Ray Tube) or the like for displaying an image that corresponds to the video signal from the graphic processing section 15, and loudspeakers (not illustrated) for outputting sound corresponding to the sound signal from the sound processing section 14. Although a television receiver is normally used as the output device 6, it should be understood that output device is not limited to being a television receiver.

Next, the areas allocated in the RAM 12 of FIG. 1 and the data stored in the respective areas will be described in detail in accordance with an embodiment of the present invention.

Figure 3:
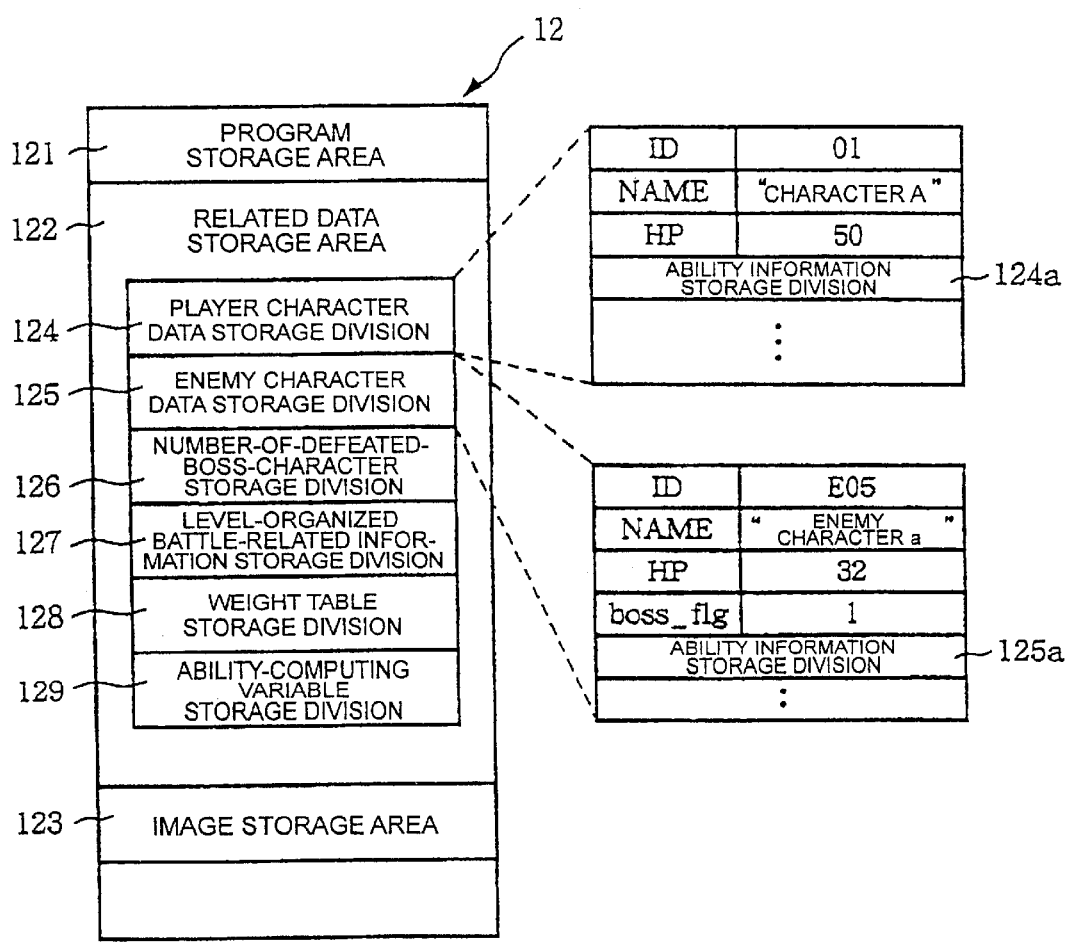
FIG. 3 is a diagram to show the areas allocated in the RAM of FIG. 2 in accordance with an embodiment of the present invention.

FIG. 3 is a diagram to show the areas allocated in the RAM 12 according to one embodiment of the present invention. As illustrated, allocated in the RAM 12 are a program storage area 121, a related data storage area 122, an image storage area 123, and so on. Programs and data stored in these areas 121 to 123 are those read out of the CD-ROM 4 by the CD-ROM drive 16 in accordance with the control of the control section 11 and transferred to the RAM 12.

The program storage area 121 stores programs necessary for execution of the game, including the programs illustrated in the flowcharts described hereinafter, and the like.

Formed in the related data storage area 122 are typically a player character data storage division 124, an enemy character data storage division 125, a number-of-defeated-boss-character storage division 126, a level-organized battle-related information storage division 127, a weight table storage division 128, and an ability-computing variable storage division 129.

The player character data storage division 124 generally stores ID, NAME (name), and HP (hit point) of the player characters and has an ability information storage division 124a formed therein. ID includes identification information assigned to each character. NAME includes a name of the character on the game. HP is arranged to indicate the remaining endurance of the character. The value of HP may be reduced according to damage caused when the character is exposed to an attack of another character. When the value of HP reaches a minimum value, e.g. zero, the character is typically considered to incapable of fighting a battle. The value of HP may generally be increased up to approximately the value of HPmax described hereinafter, for example, by moving the character to a specific place set in the game. The enemy character data storage division 125 generally stores ID, NAME, HP, and boss_flg (boss flag) of the enemy characters and has an ability information storage division 125a formed therein. "boss_flg (boss flag)" is typically a flag which indicates that with "1" the enemy character is a boss character and with "0" the enemy character is an ordinary character. That is boss fig is arranged to identify whether an enemy character is a boss character or an cordially character.

In the ability information storage division 124a of the player character, as illustrated according to one embodiment in FIG. 4, values such as an "initial ability value," a "final ability value," and a "current ability value," of the player character are stored against a "maximum hit point (HPmax)," an "attack power (Atk)," a "hitting rate (Hit)," a "defense power (Def)," an "evasion ability (Eva)," a "magic attack power (MAtk)," and a "magic defense power (MDef)."

In the described embodiment, each of the ability values has the following meaning with respect to the game. The maximum hit point is typically the maximum of HP that may be set for the character. The attack power is a value that is often used in the computation of damage to an enemy character when the character of interest is made to conduct attack action. The larger the value of attack power, the greater the damage to the enemy character. The hitting rate is typically used in computation to compute whether damage should be caused to, e.g., inflicted upon, the enemy character when the character of interest is made to conduct attack action. In general the larger the value of the hitting rate, the greater the probability of causing the damage to the enemy character.

The defense power is typically used in computation of damage to the character of interest when the character of interest is subjected to an attack of an enemy character. In general the larger the value of the defense power, the smaller the damage to the character. The evasion ability may be used in computation to compute whether damage should be caused to the character when it is subjected to an attack of an enemy character. The larger the value of the evasion ability, the smaller the probability of causing the damage to the character typically is.

The magic attack power may be used in computation of damage to the enemy character when the character of interest makes an attack with magic. The larger the value of the magic attack power, the greater the damage to the enemy character typically is. The magic defense power may be used in computation of damage to the character of interest when it is subjected to an attack of an enemy character with magic. The larger the value of the magic defense power, the smaller the damage to the character may be.

As described above, the ability values set for each character generally act more advantageously in the battles involving the character as the values become larger. Therefore, increase in the ability values of the player character often lead to relaxation, or a decrease in, of the difficulty in the players clearing each dungeon or, more generally, stage or level.

In the following description, attention will be focused on HPmax as a typical example of the ability values of the player character and how HPmax varies with progress of the game will be described. The processing procedures used to affect an increase of the values similar to those of HPmax may also apply to the ability values other than Hpmax, as will be appreciated by those skilled in the art.

The "initial ability value" of the maximum hit point=50 is a value of HPmax at the start of the game, which is a fixed value, e.g., a value of fifty. The final ability value (End_HPmax) of the maximum hit point is an ability value achieved after the player character has defeated all the boss characters (99 characters), which is also fixed, e.g., at a value of 750. The current ability value (HPmax) of the maximum hit point is, in the described embodiment, a maximum hit point of the player character at the present time, which is typically a value that sequentially varies with progress of the game. The current ability value (HPmax) that may be equal to fifty in the figure indicates a value substantially immediately after the start of the game. The ability value (Base_HPmax) immediately after a level rise, of the maximum hit point may be a maximum hit point substantially immediately after the level of the player character is raised to the current level. The ability value immediately after the level rise (Base_HPmax) which may be equal to fifty as shown in the figure indicates a value immediately after the start of the game.

In the ability information storage division 125a of each enemy character, as illustrated in one embodiment in FIG. 5, the current ability value of the enemy character may be stored per "maximum hit point (HPmax)," "attack power (Atk)," "hitting rate (Hit)," "defense power (Def)," "evasion ability (Eva)," "magic attack power (MAtk)," and "magic defense power (MDef)."

The aforementioned number-of-defeated-boss-character storage division 126 generally stores the number of boss characters defeated by the player character and, in the present embodiment wherein the total number of boss characters is 99, a number of 0 to 99 is stored therein. It should be understood that the total number of boss charcters may be generally be widely varied.

In the aforementioned level-organized battle-related information storage division 127, as illustrated in one embodiment in FIG. 6, "number of defeated boss characters," "assumed number of battles," and "specific gravity of ordinary characters" are stored corresponding to the levels 1 to 99. Namely, in the game according to this embodiment, the level is "1" at the start of the game and the level is raised by one. rank per defeat of a boss character. Therefore, "level" and "number of defeated boss characters" are in one-shifted correspondence relation, in the described embodiment. The "specific gravity of ordinary characters" is a rate of an improvement that may be increased by defeating the ordinary characters, to a hit point improvement ($\alpha$) upon the level rise, which will be detailed hereinafter, as a ratio to "10." Although a ratio of ten is used in the described embodiment, it should be understood that the ration may be widely varied. Therefore, when "specific gravity of ordinary characters" is equal to five, the indication is that 5/10 of the hit point improvement (α) upon the level rise is the maximum range of the hit point that may be increased by defeating the ordinary characters. Namely, unless the level of the player character is raised, the hit point does not increase over the maximum range even with further defeat of ordinary characters. The "assumed number of battles" is the number of battles necessary for the player character to fight with the ordinary characters before it arrives at the maximum of the hit point that may be increased by defeating ordinary characters.

In the weight table storage division 128, as illustrated in one embodiment in FIG. 7, "assumed clear level" and "weight of enemy" are stored corresponding to "dungeon number" assigned to each dungeon. The higher the difficulty of the corresponding dungeon, the greater the value set in "assumed clear level." A dungeon with a high difficulty means, in the described embodiment, a dungeon that includes a boss character provided with high ability values. The "weight of enemy" indicates points gained when the player character defeats an ordinary character in the corresponding dungeon.

Figure 8:
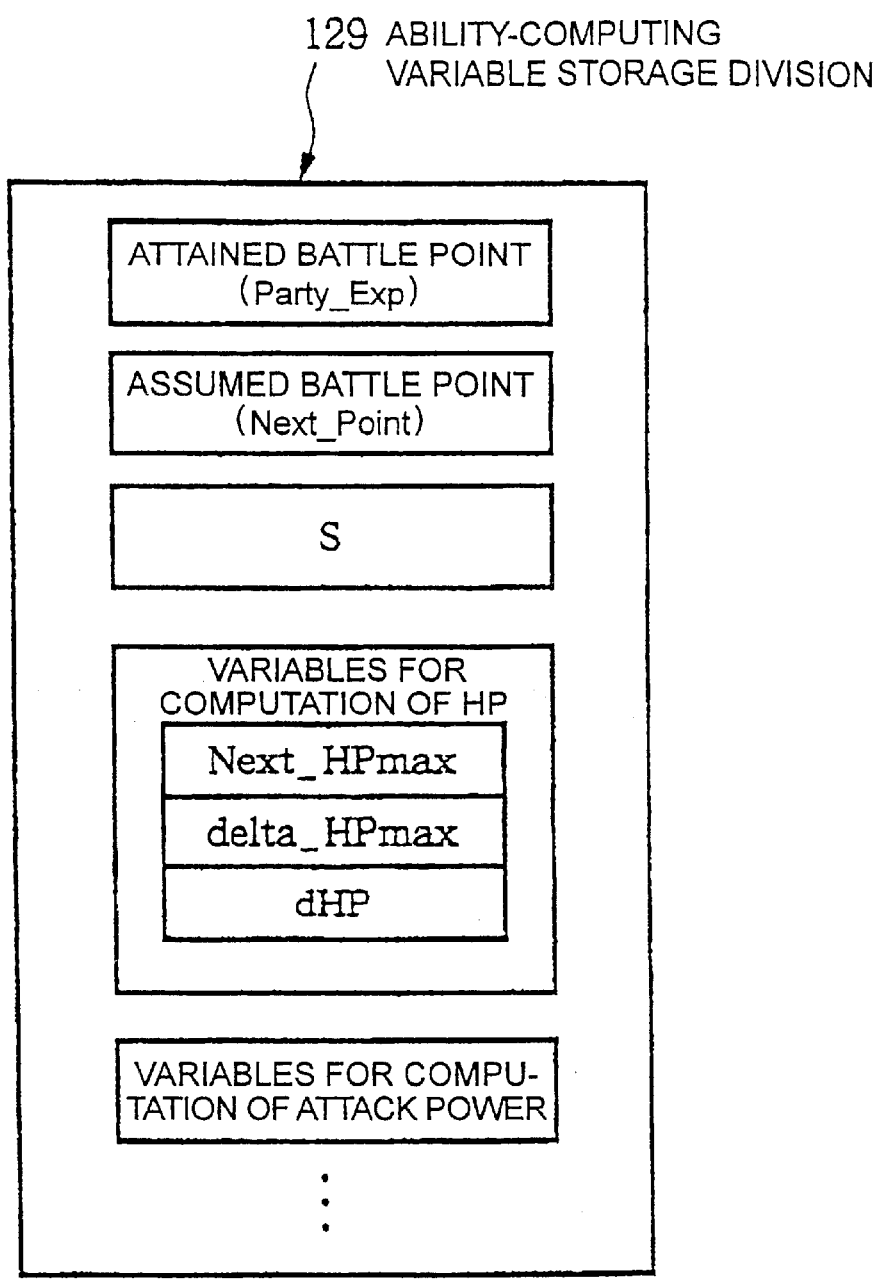
FIG. 8 is a conceptual diagram to show the details of the ability-computing variable storage division in accordance with an embodiment of the present invention.

The ability-computing variable storage division 129 stores values that may include an attained battle point (Party_Exp), an assumed battle point (Next_Point), a level S of the player character, variables for computation of HP; Next_HPmax, delta_HPmax, dHP; and S, as illustrated in one embodiment in FIG. 8. The attained battle point (Party_Exp) is a point at the present, or current time, accumulated when the player character defeats the ordinary characters. The assumed battle point (Next_Point) may be a value obtained by multiplying the aforementioned "assumed number of battles" by the aforementioned "weight of enemy" in each level. The initial value (substantially immediately after the start of the game) of S is "1" and S is a value counted up one per defeat of a boss character in one embodimement.

The variables for computation of HP are variables used in computation of HP at the time of completion of the battle, wherein Next_HPmax is HPmax assigned to the player character on the occasion of a next rise of the level. Further, in the described embodiment, delta_HPmax is an increase range of Hpmax, while dHP is an upper limit to indicate how much HP may be increased by defeat of the ordinary characters. Each of these variables is stored per "attack power," "hitting rate," etc., which are illustrated in FIG. 4.

The variables stored in the ability-computing variable storage division 129 are all values of natural numbers. It should be appreciated, however, that the values may generally include, but are not limited to, characters and character strings, in addition to numbers.

In the present embodiment according to the above structure, when the game is started, the control section 11 reserves the areas for storage of information in the RAM 12, thereby reserving the program area 121, related data area 122, image storage area 123, etc. in the RAM 12, as illustrated in FIG. 3. Then receiving a game start request, the control section 11 reads the information necessary for the game to be started out of the CD-ROM 4 or other storage medium into the RAM 12 and makes an image displayed on the display screen 61, based on the game program thus read. The player advances the game while manipulating the keys and buttons of the input device 3 based upon the image on the display screen 61.

Next, the processing procedures of the game according to the embodiment of the present invention will be described. The processing presented below is processing that the control section 11 carries out while controlling the other components in the game apparatus, based on the game program stored in the CD-ROM 4 or on another appropriate storage medium.

Figure 9:
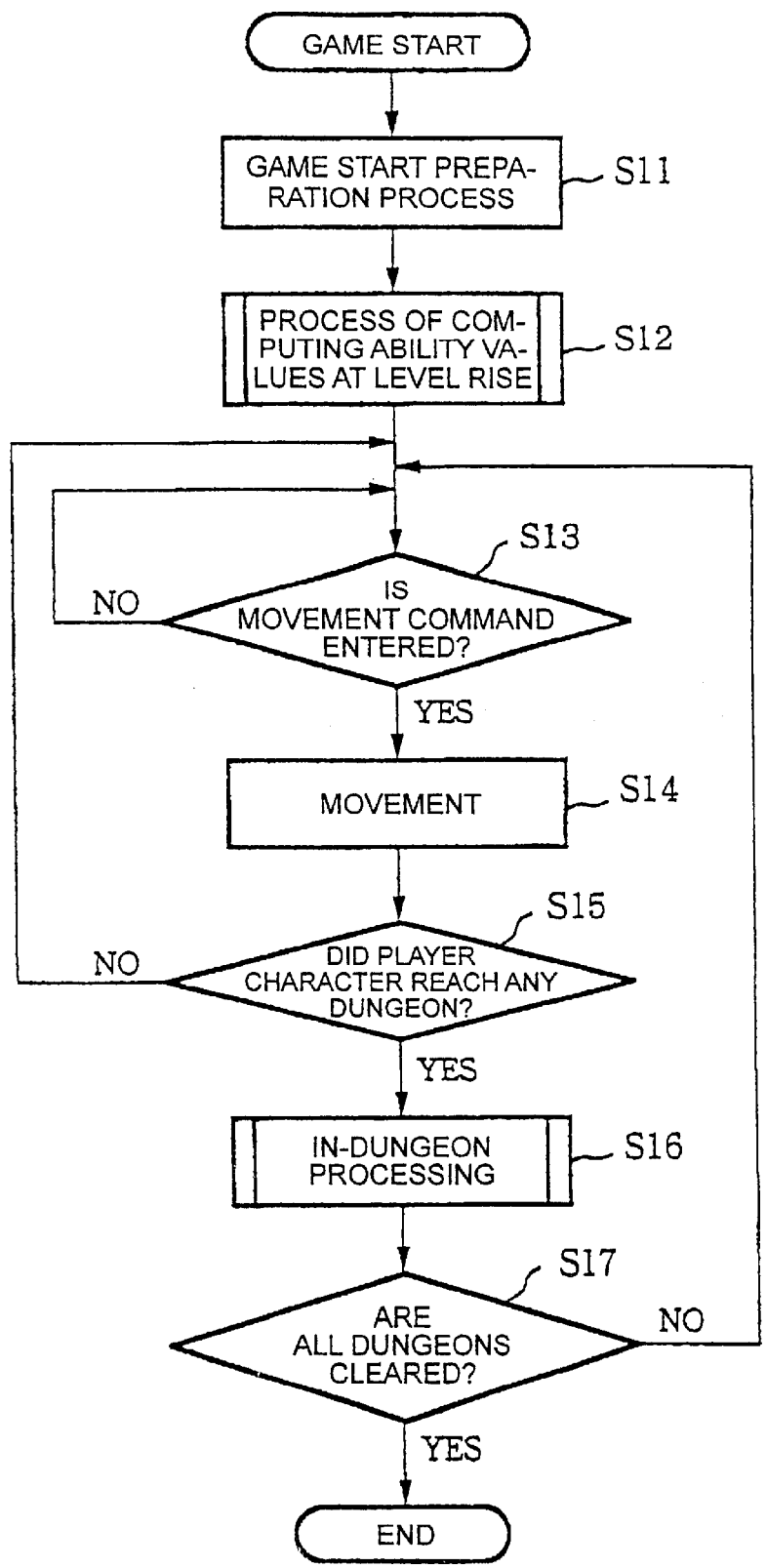
FIG. 9 is a flowchart to show the processing procedures at the start of the game in accordance with an embodiment of the present invention.

FIG. 9 is a flowchart that shows the global processing of a game in accordance with an embodiment of the present invention. A game start preparation process may be carried out once power is provided to the main body 2 of the game machine (step S11). This process includes, but is not limited to, a process to read the game program from the CD-ROM 4 or other suitable storage medium and to display a screen in which the player character is placed in the field on the game. The process ability values illustrated in FIG. 4 may be set as ability values of the player character. Then, a level-rise-time ability value computing process is carried out (step S12). A plurality of dungeons are also placed in the field.

Next, the control section executes a detection process to detect whether a movement command is entered by key manipulation on the input device 3 (step S13). This process may be repeated until entry of the movement command. With entry of the movement command, the control section typically carries out a movement process of the player character in accordance with the movement command thus entered (step S14). Then the control section carries out a process to determine whether the player character thus moved has reached a position of a dungeon set on the field (step S15). In this way the player may move the player character to an arbitrary position in the field by key manipulation from the input device 3. When the player character is moved to a position of an arbitrary dungeon placed in the field, that dungeon is selected. Then the control section transfers to processing in the dungeon in the described embodiment. This implies that an arbitrary dungeon may be selected by moving the player character thereto.

After the player character reaches a position of a dungeon, an inrush process into the dungeon is carried out (step S16). The details of the processing in the dungeon are illustrated in one embodiment in FIG. 9 and specific description thereof will be given hereinafter. When in the process of step S15 it is determined that the player character is not in any dungeon yet, the control section transfers to the process of step S13 to carry out the detection process of the movement command.

After completion of the in-dungeon processing of step S16, the control section carries out a process of determining whether substantially all the dungeons are cleared (step S17). The game may be terminated when it is determined that all the dungeons are cleared. When it is determined that there still remains at least one dungeon to be cleared, the control section moves to the process of step S13 to carry out the detection process of the movement command.

Figure 10:
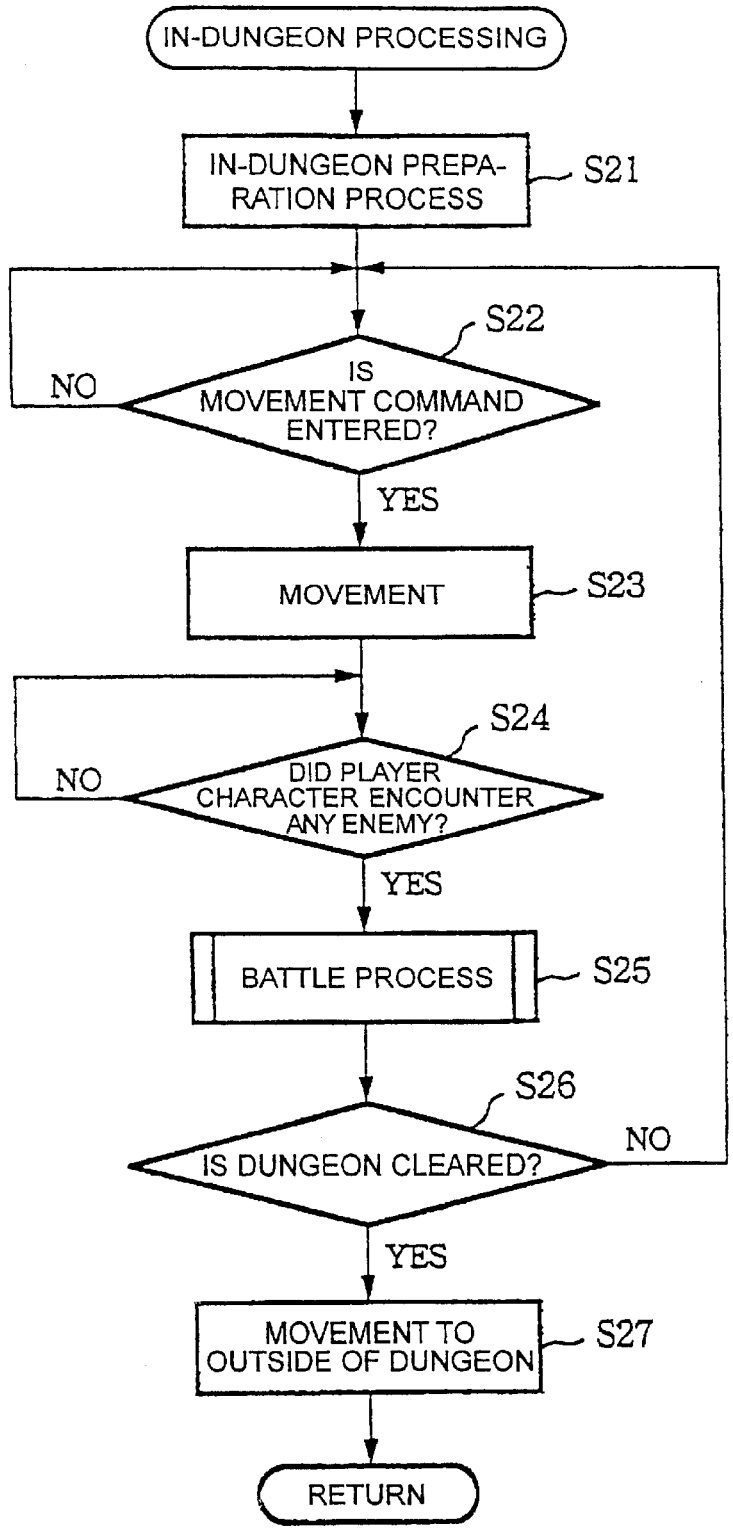
FIG. 10 is a flowchart to show the processing procedures in the in-dungeon processing in accordance with an embodiment of the present invention.

FIG. 10 is a flowchart to show the details of the in-dungeon processing in accordance with an embodiment of the present invention. Moving into the in-dungeon processing, the control section first carries out an in-dungeon preparation process (step S21). The in-dungeon preparation process generally includes, but is limited to, a process of displaying an image in the dungeon and a process of displaying the enemy characters placed in the dungeon.

After completion of the preparation, the control section performs a process of detecting whether a movement command is entered by key manipulation on the input device 3 (step S22). This process is typically repeated until entry of the movement command is detected. With entry of the movement command, the control section carries out the movement process of the player character in accordance with the movement command entered (step S23).

Figure 11:
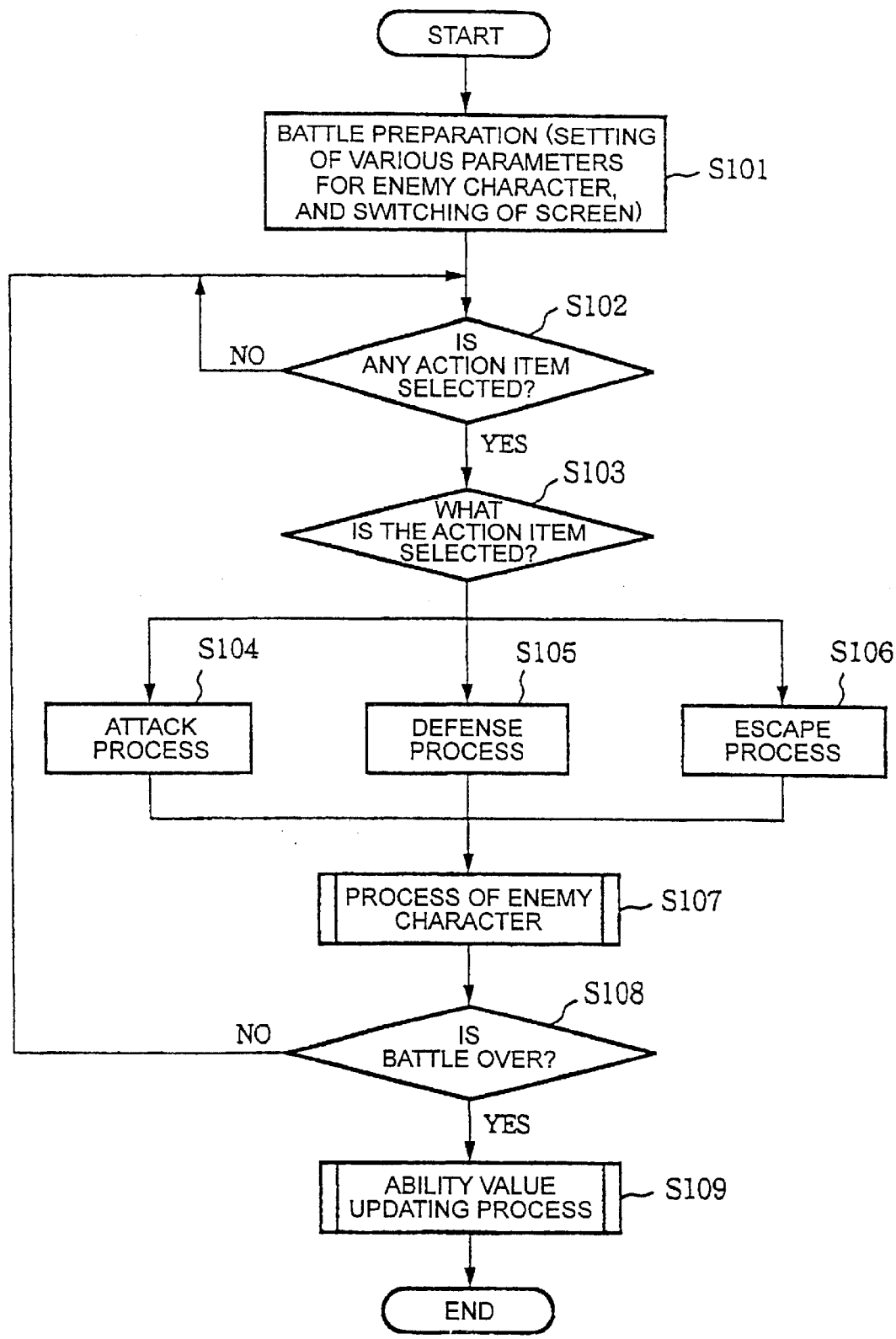
FIG. 11 is a flowchart to show the processing procedures in the battle process in accordance with an embodiment of the present invention.

Next, the control section executes a process of determining whether the player character thus moved encountered an enemy character placed in the dungeon (step S24). In this process, the player character is generally assumed to encounter an enemy character, if the player character is located at a close distance within a particular, e.g., fixed, range to the enemy character displayed on the screen. With an encounter with an enemy character, a battle process is carried out (step S25). The details of the battle process are illustrated in FIG. 11 and specific description thereof will be given hereinafter. Without an encounter with an enemy, the control section moves to the process of step S22 to carry out the process of detecting whether a movement command is entered.

After completion of the battle process of step S25, the control section carries out a process of determining whether the dungeon is cleared (step S26). Whether the dungeon is cleared is determined based on whether the boss character located at a final destination of the dungeon has been defeated. When the dungeon is cleared, a movement process to the outside of the dungeon is carried out (step S27). When the dungeon is not cleared yet, the control section transfers to the process of step S22 to carry out the process of detecting whether a movement command is entered.

As described above, in the above described embodiment, the battle process with the enemy character is executed substantially only when the player moves the player character into the vicinity of the enemy character by key manipulation. Therefore, if the player desires to increase the ability values of the player character by through participating in a battle with an ordinary character, the player may move the player character to the vicinity of the ordinary character displayed on the screen. On the other hand, if the player desires to participate in a battle with the boss character early rather than battling with the ordinary characters, the player may move the player character to the boss character while passing by the side of the ordinary characters so as to keep the distance between the player character and the ordinary characters out of the range specified to substantially automatically begin a battle with an ordinary character. Namely, the player may essentially voluntarily select whether or not a challenge is to be made to start a fight with an ordinary character, by how the player character is moved.

Next, the details of the battle process will be described. FIG. 11 is a flowchart to show the procedures in the battle process in accordance with an embodiment of the present invention.

As illustrated in the flowchart of FIG. 11, the control section typically first executes a battle preparation process to perform a process of setting of various parameters for the enemy characters, as well as a process of switching screens (step S101). Then the control section waits for selection of an action item, which is typically made by manipulation of the keys and buttons on the input device 3 (step S102) and, with the selection of an action item, the control section carries out a process of discriminating a kind thereof, e.g., identifying a selected action item (step S103). Based on the result of this discrimination or identification, an attack process may be executed with an action item of attack (step S104), a defense process may be executed with an action item of defense (step S105), or an escape process may be executed with an action item of escape (step S106). Further, a process of enemy character may be executed (step S107), thereafter a process of discriminating whether the battle is over may be carried out (step S108). In addition, the processing from step S102 is generally carried out repeatedly until the end of the battle, and an ability value updating process may be carried out at the time of the end of the battle (step S109). The HPmax updating process that is a part of this ability value updating process (step S109) is carried out according to the flowchart illustrated in FIG. 12 in accordance with an embodiment of the present invention. It should be appreciated that the steps associated with the Hpmax updating process, as well as other processes of the present invention, may generally be widely varied without departing from the sprit or the scope of the present invention, By way of example, steps maybe added, removed, changed, or recorded.

Figure 12:
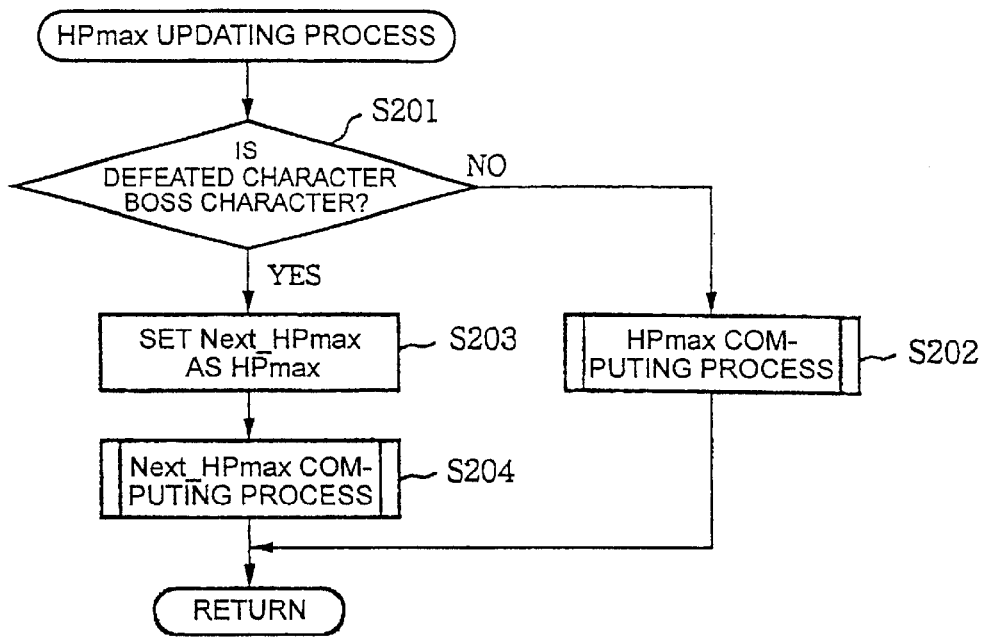
FIG. 12 is a flowchart to show the processing procedures in the HPmax updating process in accordance with an embodiment of the present invention.

As shown in FIG. 12, first, the control section carries out a process of determining whether the enemy character defeated in the battle process is a boss character (step S201). When the defeated character is not a boss character but an ordinary character, HPmax computation and updating processing is carried out according to the flowchart described hereinafter (step S202). If the defeated enemy character is a boss character, the control section carries out a process of setting Next_HPmax as HPmax at the raised level (step S203). Subsequent thereto, the control section executes, according to the flowchart described hereinafter, a Next_ HPmax computing process for computing Next_HPmax which is HPmax assigned to the player character on the occasion of a rise to the next level (step S204).

The updating of HPmax in step S202 results, in the described embodiment, in decreasing the difficulty in defeating the boss character in the dungeon that the player character entered. In other words, the difficulty in defeating the boss character is gradually relaxed or reduced through repetition of battles with the ordinary characters. On the other hand, the updating of HPmax in step S203 results in decreasing the difficulties in clearing the other dungeons. Although Next Hpmax may generally be computed as having substantially any suitable value, Next_HPmax is typically preliminarily computed or set to the value of HPmax. Therefore, a value obtained by subtracting the value of HPmax approximately immediately before the defeat of the boss character from the value of Next_HPmax may be considered to represent a decreasing amount of the difficulties.

It is, however, noted that the ability values will generally never increase over the value set in dHP if only the ordinary characters are defeated without defeating the boss character. Namely, the sum of relaxation of the difficulties at the same level is limited by dHP in the described embodiment.

The Next_HPmax computing process is carried out first at the start of the game in step S12 of FIG. 9 and thereafter is carried out substantially every time the boss character is defeated.

Figure 13:
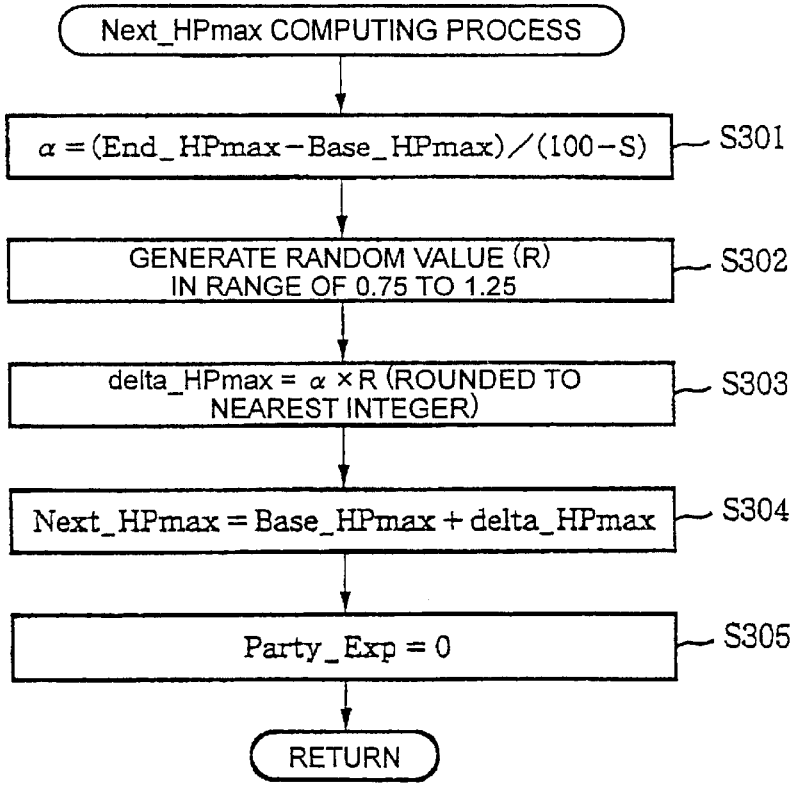
FIG. 13 is a flowchart to show the processing procedures in the Next_HPmax computing process in accordance with an embodiment of the present invention.

This Next_HPmax computing process (step S12 of FIG. 9 and step S204 of FIG. 12) is carried out according to the flowchart illustrated in FIG. 13 in accordance with an embodiment of the present invention. Namely, $\alpha$ is first computed according to the equation, $\alpha = (\text{End\_HPmax} - \text{Base\_HPmax})/(100-S)$ (Step S301) in the described embodiment. It should be understood that the equation may generally vary.

In the equation, the symbols are defined as follows.

End_HPmax: final ability value of maximum hit point (HPmax), which is "750" in the present embodiment (see FIG. 4)

Base_HPmax: HPmax approximately immediately after clearance of a dungeon

S: value counted up one per defeat of the boss character from the initial value (approximately immediately after the start of the game), e.g., an initial value of "1"

Figure 14A:
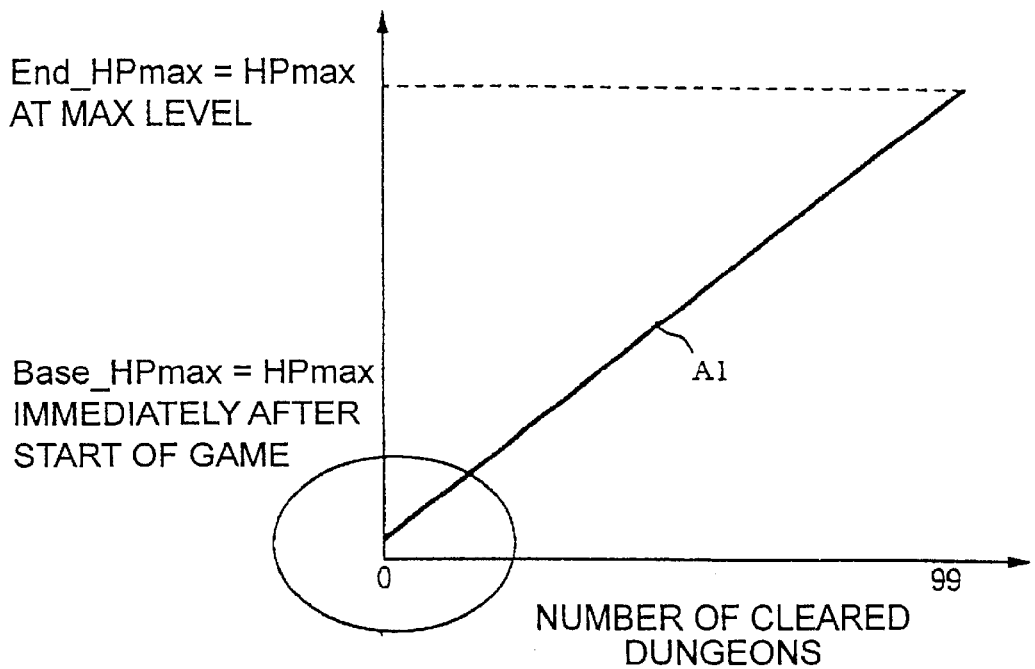
FIG. 14A is a graph to show the relation between the number of cleared dungeons and HPmax in computation of Next_HPmax immediately after the start of the game in accordance with an embodiment of the present invention.
Figure 15A:
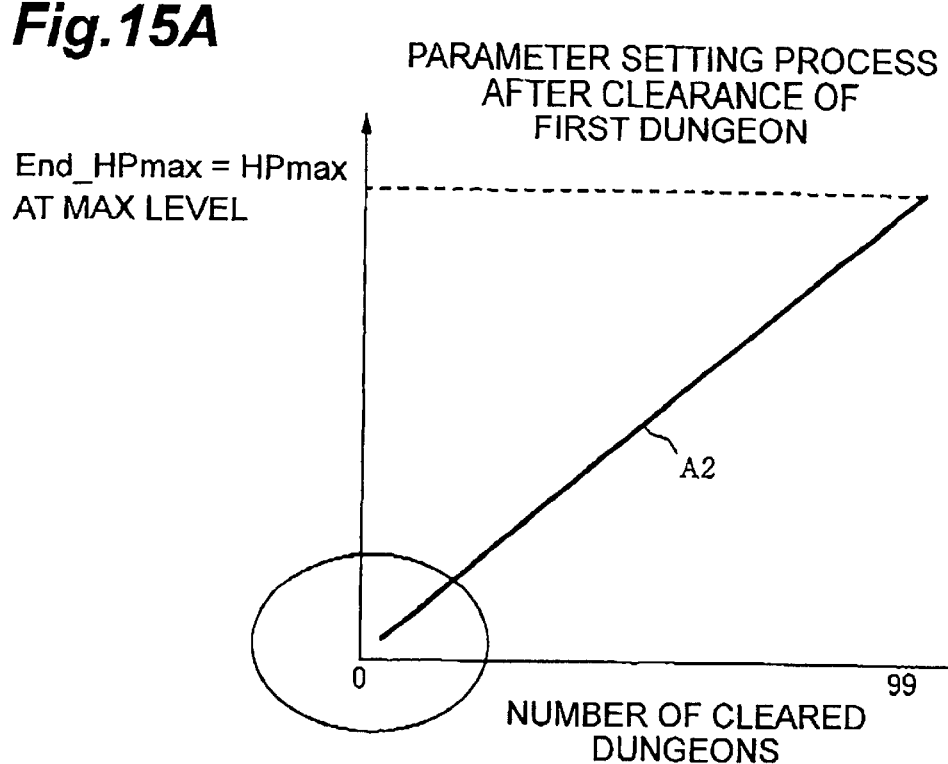
FIG. 15A is a graph to show the relation between the number of cleared dungeons and HPmax in computation of Next_HPmax at level 1.

Therefore, (End_HPmax—Base_HPmax) in the above equation is effectively a value of difference between Base_HPmax being HPmax approximately immediately after the start of the game and End_HPmax being HPmax at the maximum level, as illustrated in FIG. 14A, in accordance with an embodiment of the present invention, or a value of the difference between Base_HPmax being HPmax approximately immediately after clearance of the dungeon and End_HPmax being HPmax at the maximum level, as illustrated in FIG. 15A in accordance with an embodiment of the present invention.

Since S is the value counted up one per defeat of the boss character from the initial value, as for example the value of "1," (100—S) generally represents the number of remaining level rises. Therefore, α is a value obtained by dividing the difference between the final ability value (End_HPmax) and the current ability value (Base_HPmax) by the number of remaining level rises (100–S), which indicates a hit point improvement under the assumption that hit point improvements upon respective level rises are equal up to the final level.

Figure 14B:
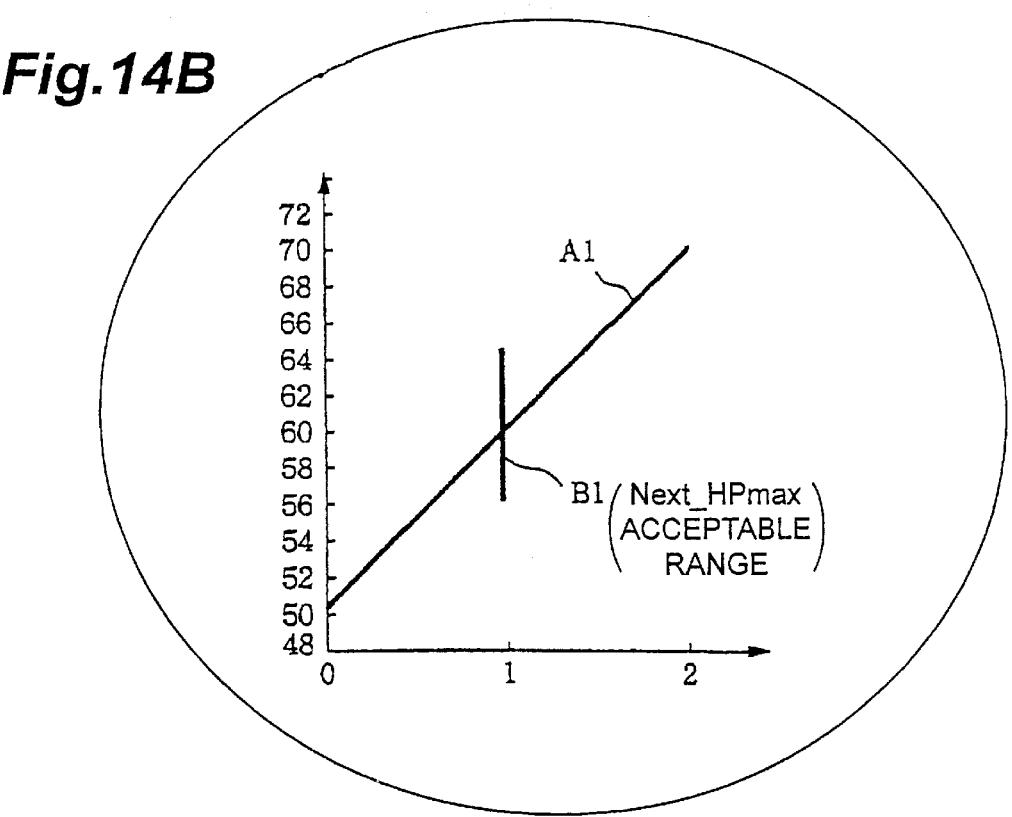
FIG. 14B is a partly enlarged view thereof in accordance with an embodiment of the present invention.
Figure 15B:
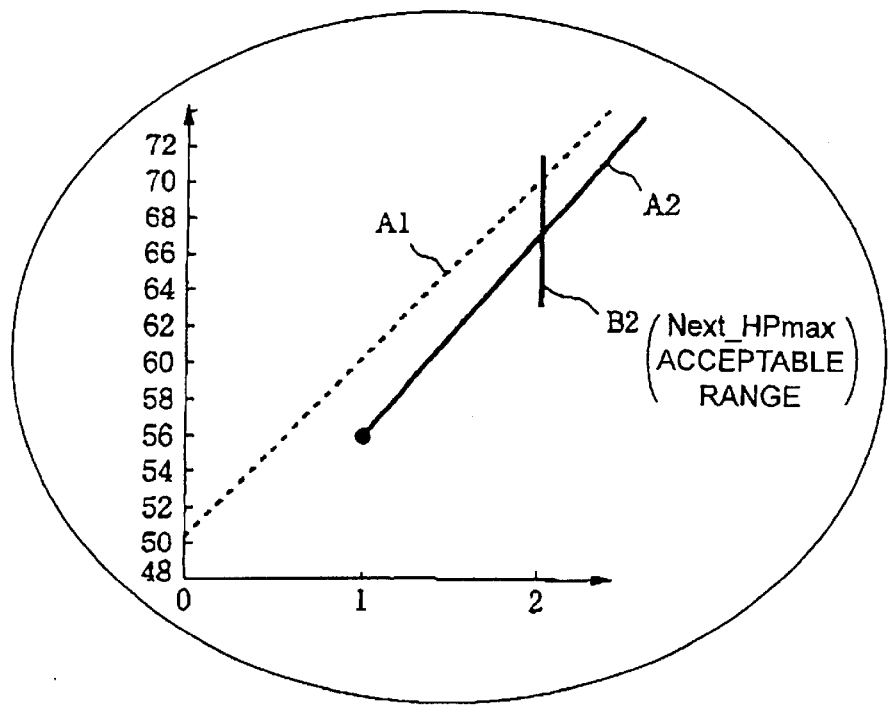
FIG. 15B is a partly enlarged view thereof in accordance with an embodiment of the present invention.

Consequently, since HPmax at the start of the game is "50" (the initial ability value with reference to FIG. 4, which is the maximum hit point "50"), supposing the hit point improvements α upon the respective level rises are equal up to the final level, numbers of cleared dungeons and values of HPmax after clearance are presented by a straight line of change Al connecting a point at the number of cleared dungeons=0 and HPmax=50 and a point at the number of cleared dungeons=99 and HPmax=750 (final ability value), as illustrated in FIG. 14. Let us suppose here that one dungeon is cleared by defeating the boss character after the start of the game and HPmax (=Base_HPmax) at this time is "56." Then, supposing the hit point improvements α upon the respective level rises thereafter are equal up to the final level, as illustrated in FIG. 15, the numbers of cleared dungeons and the values of HPmax after clearance are presented by a straight line of change A2 connecting a point at the number of cleared dungeons=1 and HPmax=56 and a point at the number of cleared dungeons=99 and HPmax =750 (final ability value), different from the aforementioned straight line of change Al.

Next, a random value R is generated in the range of 0.75 to 1.25 (step S302), and then the hit point improvement (delta_HPmax) up to the time of the next level rise is obtained by computing delta_HPmax=α×R and rounding off the resultant to the nearest integer (step S303). Therefore, as a result of the operation of delta_HPmax=α×R using the random value R in the range of 0.75 to 1.25, delta_HPmax takes one value within the range of α±25%.

After that, the maximum hit point (Next_HPmax) after the next level rise is obtained by the operation of Next_HPmax=Base_HPmax+delta_HPmax (step S304). Consequently, supposing the current time is a point immediately after the start of the game and Base_HPmax =50, a value of a natural number is computed as Next_HPmax within the range of an allowable straight line B1 intersecting on the number of cleared dungeons "1" with the straight line of change A1 illustrated in FIG. 14B. This Next_HPmax is HPmax set when the number of cleared dungeons becomes "1." Supposing the current time is a point immediately after clearance of one dungeon and Base_HPmax=56, a value of a natural number is computed as Next_HPmax within the range of an allowable straight line B1 intersecting on the number of cleared dungeons "2" with the straight line of change A2 illustrated in FIG. 15B. This Next_HPmax is a value of HPmax set when the number of cleared dungeons becomes "2." After the computation of Next_HPmax, the attained battle point (Party_Exp) described hereinafter is reset (step S305), and this Next_HPmax computing process is terminated.

Accordingly, in step S204 of FIG. 12, HPmax at the time of the next defeat of the boss character, i.e., upon the next level rise is preliminarily computed as Next_HPmax, and on the occasion of the defeat of the boss character, Next_HPmax preliminarily computed by the process of step S203 is given as HPmax at the time of the level rise to the player character.

Figure 16:
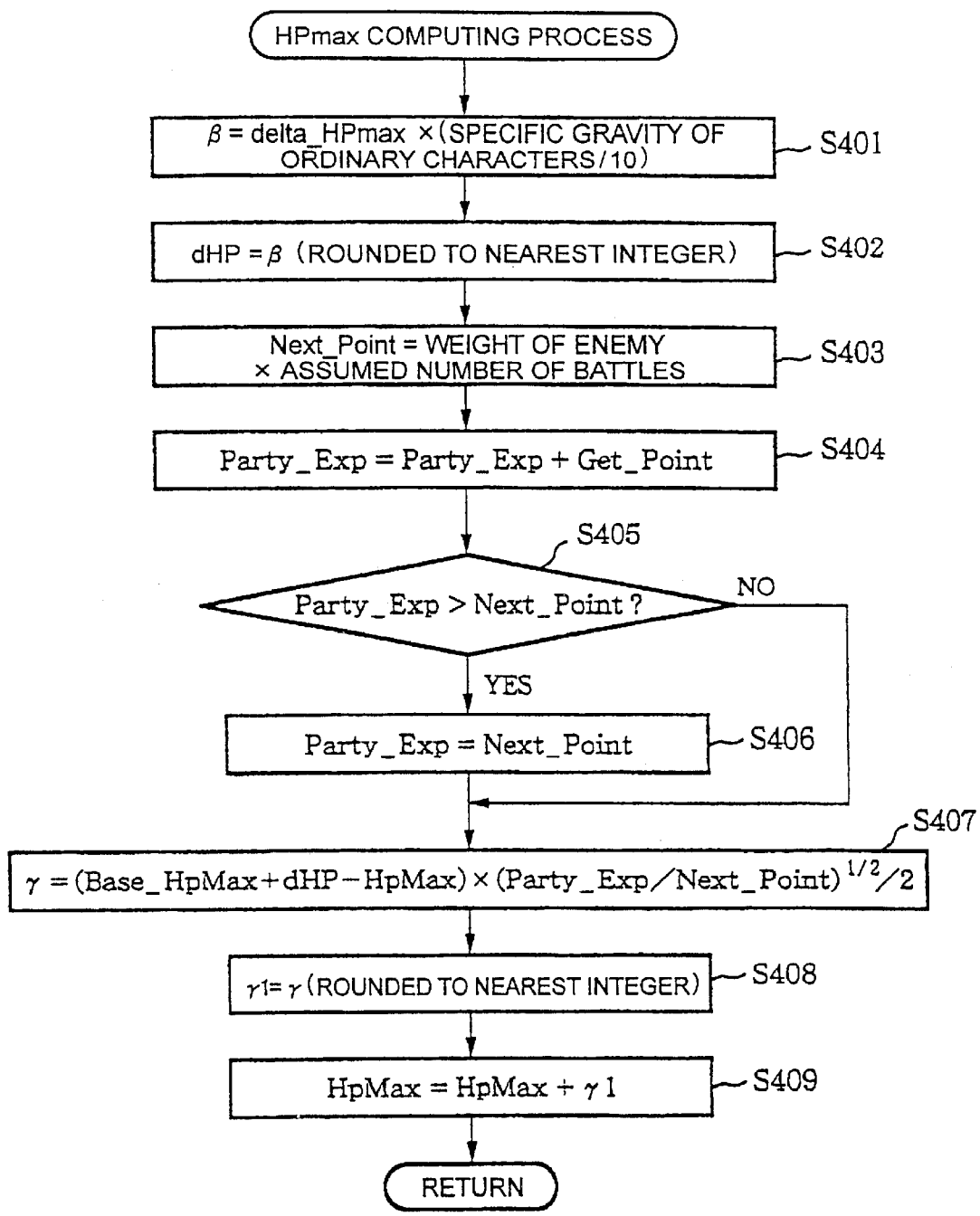
FIG. 16 is a flowchart to show the processing procedures in the HPmax computing process in accordance with an embodiment of the present invention.

On the other hand, the HPmax computing process (step S202) is carried out according to the flowchart illustrated in FIG. 16. Namely, a process of computing β is first carried out according to the operation of β=delta_HPmax×(specific gravity of ordinary characters/10) (step S401). In this equation delta_HPmax is the hit point improvement up to the time of the next level rise, as described previously. For example, when the current level is level 1, the specific gravity of ordinary characters is "5." Thus 50% of the hit point improvement (delta_HPmax) up to the time of the next level rise is the value of β. When the current level is level 2, the specific gravity of ordinary characters is "7." Then 70% of the hit point improvement (delta_HPmax) up to the time of the next level rise is the value of β. Subsequent thereto, the control section carries out a process of setting a value obtained by rounding off this β to the nearest integer, as the maximum increase amount dHP of HPmax which may be increased by defeating the characters (ordinary characters) other than the boss character (step S402).

Next, the control section carries out a process of multiplying the value of "weight of enemy" corresponding to the dungeon for which the level of the player character at the present time is set as an assumed clearing level, which is stored in the weight table storage division 128 (FIG. 7), by the value of "assumed number of battles" corresponding to the level of the player character at the present time, which is stored in the level-organized battle-related information storage division 128 (FIG. 5), to compute a battle point Next_Point necessary before the next level (step S403). Supposing the level of the player character at the present time is 1, the "weight of enemy" of the dungeon number "1" where the assumed clearing level is 1, is "1," and the "assumed number of battles" of level 1 is "5"; therefore, Next_Point=1×5=5.

Further, a value of the defeated ordinary character (Get_Point) is added to the attained battle point (Party_Exp), thereby updating Party_Exp (step S404). In this operation Get_Point is the value of "weight of enemy" of the dungeon wherein the defeated ordinary character is placed. Since Party_Exp is reset on the occasion of defeat of the boss character, i.e., on the occasion of the level rise in aforementioned step S305 (FIG. 13), it is a battle point attained by defeating the ordinary characters only at the level at the present time, and Party_Exp increases every defeat of an ordinary character at the current level.

However, the control section next carries out a process of determining whether Party_Exp exceeds Next_Point (step S405) and if yes Party_Exp is set as a value of Next_Point (step S406). If at the current level the player character defeats a plurality of ordinary characters steadily without defeating the boss character in an early stage, Party_Exp will increase every defeat before the condition of Party_Exp>Next_Point is met, but the maximum is limited to Next_Point accordingly.

Then a process of computing γ according to the next equation is carried out in next step S407.

$$\gamma = (Base\_HPmax + dHP - HPmax) \times (Party\_Exp/Next\_Point)^{1/2}/2$$

Further, a value obtained by rounding off this γ to the nearest integer is set as γ1 (step S408) and a value obtained by adding this γ1 to the original maximum hit point HPmax is set as a hit point HPmax after the battle (step S409). At this time, according to the processing in step S305 and step S306 described previously, if Party_Exp>Next_Point, Party_Exp=Next_Point. Therefore, after the condition of Party_Exp>Next_Point is met, (Party_Exp/Next_Point) in above Eq. becomes "1," and thus there will appear no change in the values of γ, γ1, and HPmax even with further defeat of ordinary characters.

Figure 17:
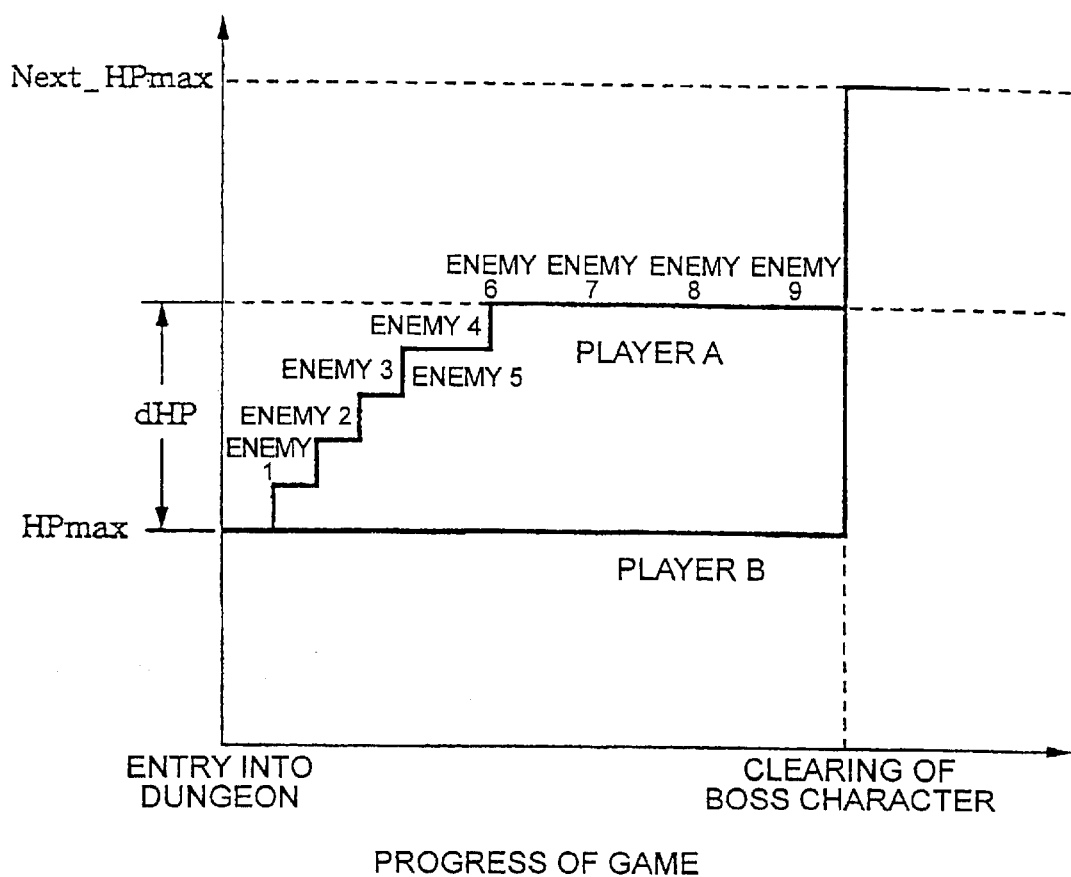
FIG. 17 is a timing chart to show the difference between changes of HPmax due to the difference between game progresses by the player A and the player B in accordance with an embodiment of the present invention.

Namely, supposing the player character defeats the first to ninth ordinary characters steadily like the player A illustrated in FIG. 17, after the condition of Party_Exp>Next_Point is met at the time of the defeat of the sixth ordinary character, HPmax does not increase even with further defeat of the seventh, eighth, and ninth ordinary characters, and, therefore, HPmax may increase merely in the scope of dHP.

Both in the case of the player character steadily defeating the first to ninth ordinary characters and then defeating the boss character like this player A and in the case of the player character defeating the boss character without any battle with the ordinary characters like the player B, at the next level after the defeat of the boss character the same value of Next_HPmax is given as HPmax by the aforementioned process of step S203 (FIG. 12). Therefore, sufficient returns of HPmax are given to the player B winning the hard battle by directly defeating the both character with making free use of high-grade strategy and without increasing HPmax through defeat of the ordinary characters. The sufficient returns may thus maintain the play zest of the player B desiring to clear the game quicker with making free use of high-grade strategy, and with the sufficient returns attained by clearing one dungeon, the player may quickly overcome a dungeon with a stronger enemy by a similar method, which may also maintain the play zest of the player B.

In the embodiment the player is allowed to voluntarily select each of the dungeons, but there are also cases wherein the order of dungeons to be cleared by the player character is preliminarily determined, depending upon the contents of the game. In such cases, the dungeons have to be cleared in the determined order.

Although the present embodiment was described as an example of the present invention realized using the game machine for home use as a platform, the present invention may also be substantiated using the general purpose computer, such as the personal computer or the like, or the arcade game machine as a platform.

In the present embodiment the programs and data for realizing the present invention were stored in the CD-ROM and this CD-ROM was used as a storage medium. However, the storage medium is not limited to the CD-ROM, but may also be a DVD (Digital Versatile Disc) or any other magnetic or optical storage medium or semiconductor memory which may be read by the computer. Further, the programs and data for implementing the present invention may also be provided in the form wherein they are preinstalled in the game machine or in the storage device of the computer.

The programs and data for realizing the present invention may also be provided in the form of use wherein they are downloaded via the communication interface 17 illustrated in FIG. 1, from another device on the network 20 connected through the communication line 19. The programs and data may also be provided in the form of use wherein they are recorded in a memory of another device on the communication line 19 and they are successively taken via the communication line 19 into the RAM 12 as occasion arises.

The programs and data for realizing the present invention may also be provided in the form of a computer data signal in which they are superimposed on a carrier wave, from another device on the network 20. In this case, transmission of the computer data signal is requested from the communication interface 17 via the communication line 19 to another device on the network 20 and the computer data signal transmitted is received and stored in the RAM 12. The present invention may also be realized in the game apparatus 1 by using the programs and data stored the RAM 12 in this way.

As described above, the present invention is implemented as follows; the difficulty is gradually decresed every time an event voluntarily challengeable on the selected stage is cleared, and when the selected stage is cleared, the difficulties of the other stages selected thereafter are relaxed according to the difficulties set for the selected stage. Therefore, the difficulty of the selected stage is merely relaxed gradually by clearing events on the stage, but the difficulty of the other stages are decreased by clearing the stage. The sufficient returns of decreasing the difficulty of the other stages may be gained by clearing the selected stage with making free use of high-grade strategy accordingly. Thus the sufficient returns may maintain the play zest of the player desiring to clear the stage quicker with use of high-grade strategy, and with relaxation of the difficulties of the other stages by clearing one stage, the player may clear the other stages quickly, which may also maintain the play zest of the player.

What is claimed is:

1. A computer data signal embodied in a carrier wave for controlling the difficulty in a video game, the game being made to progress by clearing at least one of a plurality of stages for which individual difficulties are set, the computer data signal comprising:

computer code for selecting one stage from said plurality of stages in response to a command provided by a game player;

computer code for gradually adjusting the difficulty of said selected stage substantially every time an event that is voluntarily challengeable on the selected stage is cleared by the game player during execution of the game; and computer code for adjusting the difficulties of at least one of said plurality of stages in accordance with the difficulty of said selected stage at a clearing time when said selected stage is cleared by an operation of the game player during execution of the game.

2. A control method for controlling the difficulty in a video game, the game being made to progress by clearing a plurality of stages for which individual difficulties are set, said control method comprising:

selecting one stage from said plurality of stages in response to a command provided by a game player;

gradually adjusting the difficulty of said selected stage every time an event voluntarily challengeable on the selected stage is cleared by the game player during execution of the game;

adjusting the difficulties of at least one of said plurality of stages in accordance with the difficulty of said selected stage at a clearing time when said selected stage is cleared by the game player's operation during execution of the game; and wherein a parameter for adjusting the degree of the difficulty of said selected stage is set, the degree of the relaxation in said selected stage depends on the value of said parameter, the upper limit of said parameter is set for said selected stage, and said value of the parameter is increased not more than said upper limit, when the degree of the difficulty of said selected stage is relaxed.

3. The difficulty control method according to claim 2, wherein when the degree of the difficulty of at least one of said plurality of stages is relaxed, a value corresponding to the difference between said upper limit value of said parameter and that of said parameter is added to said parameter used for adjusting the degree of the difficulty of said selected stage.

4. A control method for controlling the difficulty in a video game, the game being made to progress by clearing a plurality of stages for which individual difficulties are set, said control method comprising:

selecting one stage from said plurality of stages in response to a command provided by a game player;

gradually adjusting the difficulty of said selected stage every time an event voluntarily challengeable on the selected stage is cleared by the game player during execution of the game;

adjusting the difficulties of at least one of said plurality of stages in accordance with the difficulty of said selected stage at a clearing time when said selected stage is cleared by the game player's operation during execution of the game; and wherein said game has such a clearing condition that a player character is made to do a virtual battle with an enemy character according to manipulation input and that the player character wins a battle with a predetermined enemy character set in each of said plurality of stages, further comprising: relatively adjusting the difficulty of said selected stage by increasing an ability value, which acts more advantageously for said player character in the battle as the value becomes larger, and adjusting the difficulties of at least one of said plurality of stages by increasing said ability value.

5. A computer-readable storage medium storing a difficulty control program for making a computer execute a video game, the game being made to progress by clearing a plurality of stages for which individual difficulties are set, said difficulty control program being a program for making the computer execute the following procedures:

selecting one stage from said plurality of stages in response to a command provided by a game player;

gradually adjusting the difficulty of said selected stage every time an event voluntarily challengeable on the selected stage is cleared by the game player during execution of the game; and adjusting the difficulties of at least one of said plurality of stages in accordance with the difficulty of said selected stage at a clearing time when said selected stage is cleared by the game player's operation during execution of the game; and wherein a parameter for adjusting the degree of the difficulty of said selected stage is set, the degree of the relaxation in said selected stage depends on the value of said parameter, the upper limit of said parameter is set for said selected stage, and said value of the parameter is increased not more than said upper limit, when the degree of the difficulty of said selected stage is relaxed.

6. A computer-readable storage medium storing a difficulty control program for making a computer execute a video game, the game being made to progress by clearing a plurality of stages for which individual difficulties are set, said difficulty control program being a program for making the computer execute the following procedures:

selecting one stage from said plurality of stages in response to a command provided by a game player;

gradually adjusting the difficulty of said selected stage every time an event voluntarily challengeable on the selected stage is cleared by the game player during execution of the game; and adjusting the difficulties of at least one of said plurality of stages in accordance with the difficulty of said selected stage at a clearing time when said selected stage is cleared by the game player's operation during execution of the game; and wherein when the degree of the difficulty of at least one of said plurality of stages is relaxed, a value corresponding to the difference between said upper limit value of said parameter and that of said parameter is added to said parameter used for adjusting the degree of the difficulty of said selected stage.

7. A computer-readable storage medium storing a difficulty control program for making a computer execute a video game, the game being made to progress by clearing a plurality of stages for which individual difficulties are set, said difficulty control program being a program for making the computer execute the following procedures:

selecting one stage from said plurality of stages in response to a command provided by a game player;

gradually adjusting the difficulty of said selected stage every time an event voluntarily challengeable on the selected stage is cleared by the game player during execution of the game; and adjusting the difficulties of at least one of said plurality of stages in accordance with the difficulty of said selected stage at a clearing time when said selected stage is cleared by the game player's operation during execution of the game; and wherein said game has such a clearing condition that a player character is made to do a virtual battle with an enemy character according to manipulation input and that the player character wins a battle with a predetermined enemy character set in each of said plurality of stages, further comprising
relatively adjusting the difficulty of said selected stage by increasing an ability value, which acts more advantageously for said player character in the battle as the value becomes larger, and adjusting the difficulties of said plurality of stages by increasing said ability value.

8. A computer program product for controlling difficulty in a video game, the game being made to progress by clearing at least one of said plurality of stages for which individual difficulties are set, the computer program product comprising:

computer code for selecting one stage from said plurality of stages in response to a command provided by a game player;

computer code for gradually adjusting the difficulty of said selected stage substantially every time an event that is voluntarily challengeable on the selected stage is cleared by the game player during execution of the game;

computer code for adjusting the difficulties of at least one of said plurality of stages in accordance with the difficulty of said selected stage at a clearing time when said selected stage is cleared by an operation of the game player during execution of the game; and a computer code readable medium that stores the computer codes wherein the computer readable medium is one of a CD-ROM, a computer memory, a computer storage device, a floppy disk, a hard disk and a DVD.

* * * * *